No. 725,351. PATENTED APR. 14, 1903.
P. MONTSABRÈ.
MOBILE RAILROAD TRACK.
APPLICATION FILED MAR. 13, 1902.
NO MODEL. 4 SHEETS—SHEET 1.
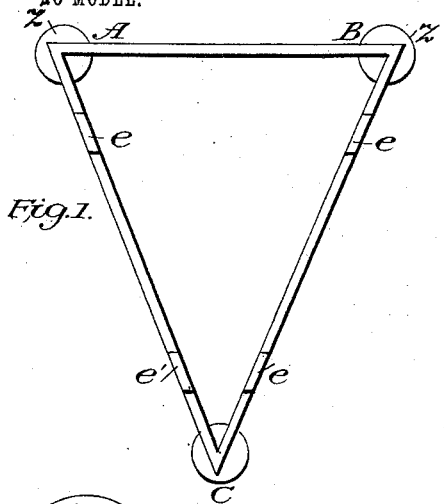
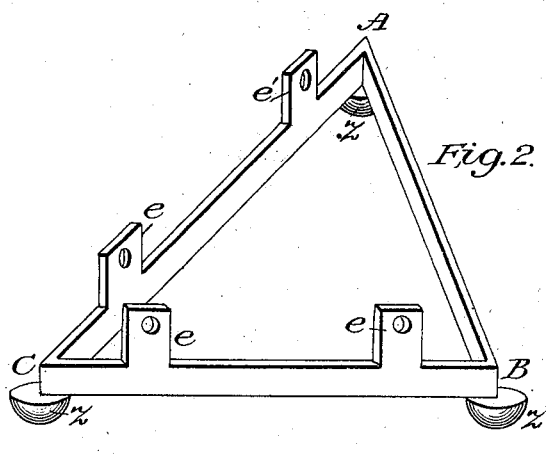
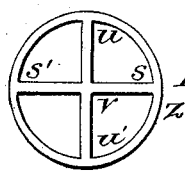
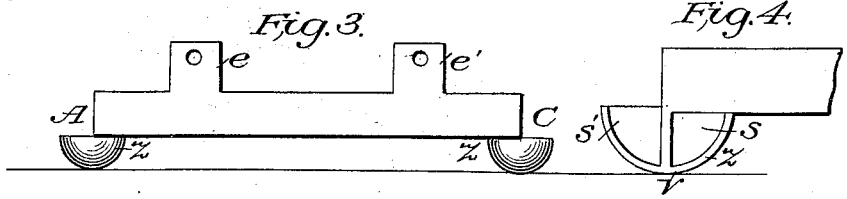
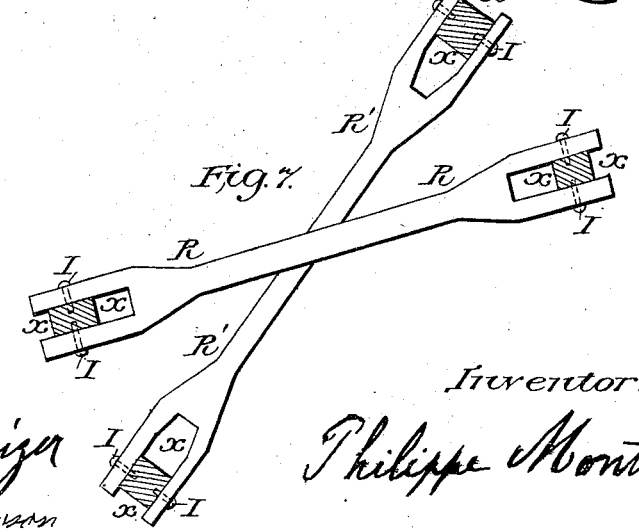
Witnesses: Inventor:
Chas. A. Schweizer Philippe Montsabrè
John M. Hutchinson

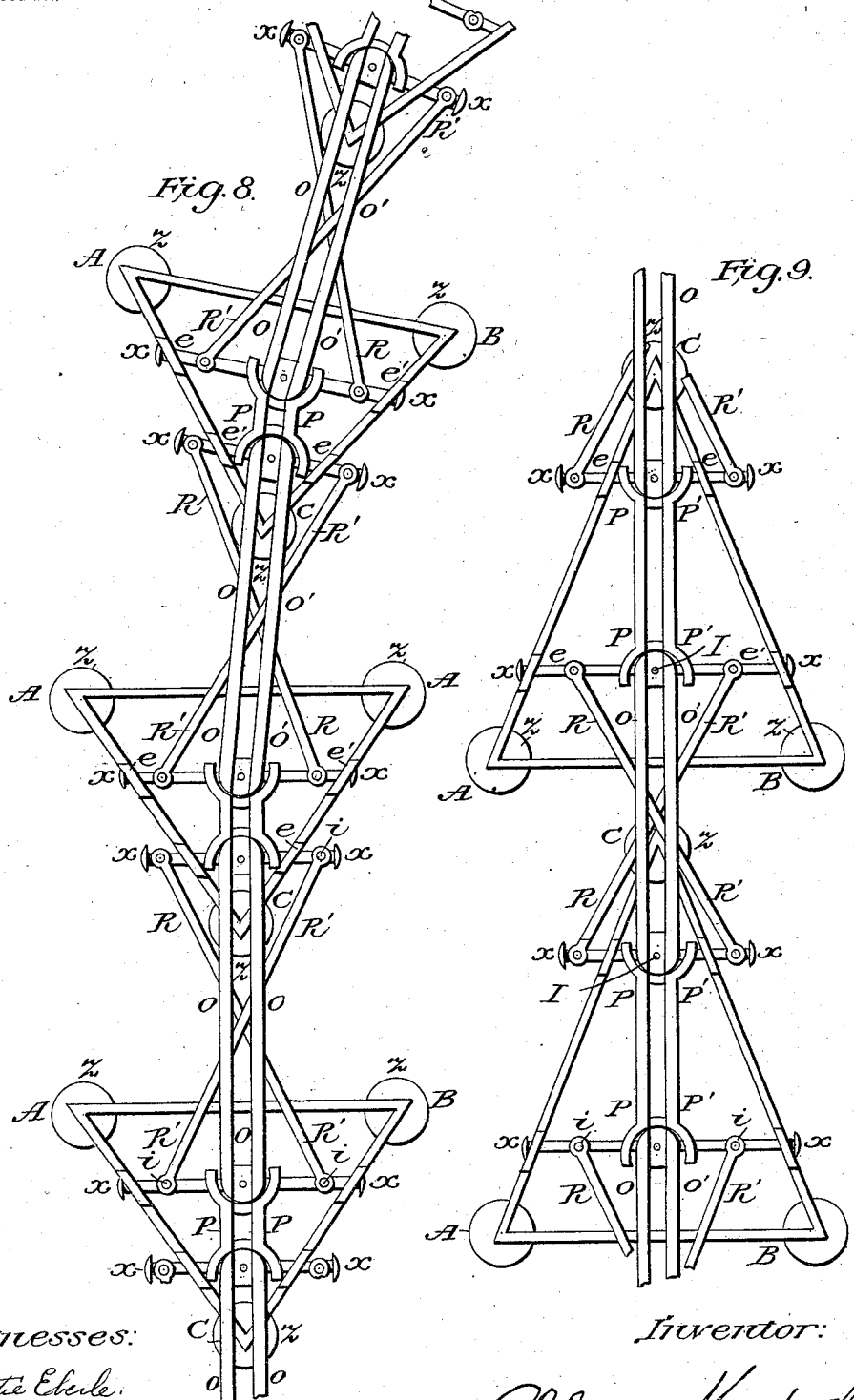

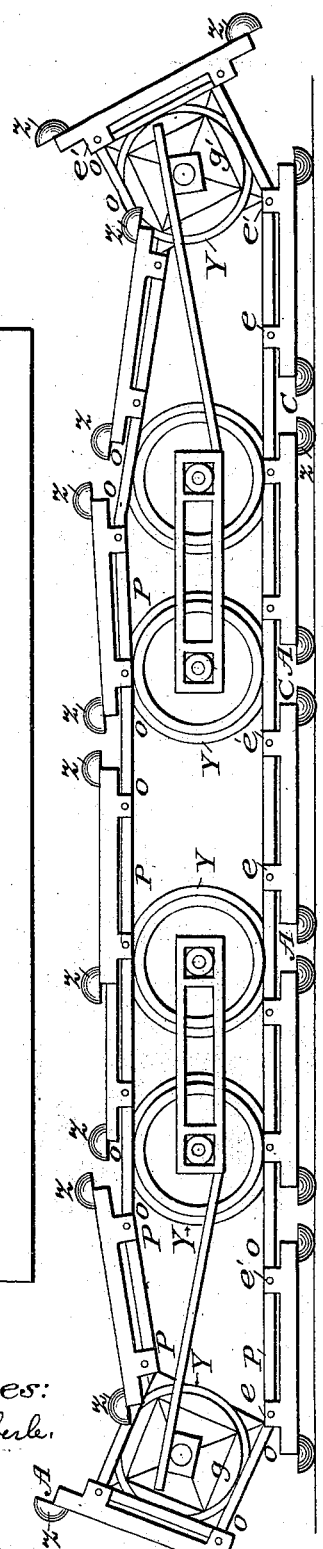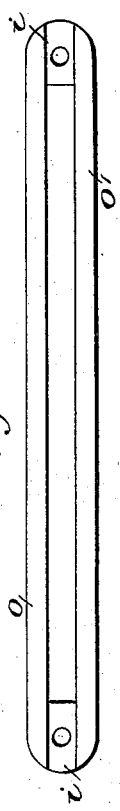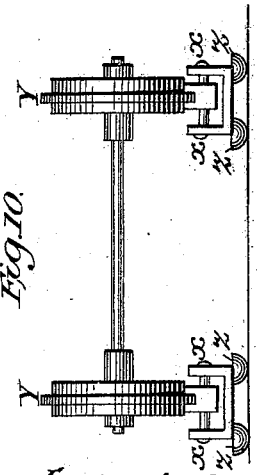

No. 725,351. PATENTED APR. 14, 1903.
P. MONTSABRÈ.
MOBILE RAILROAD TRACK.
APPLICATION FILED MAR. 13, 1902.
NO MODEL. 4 SHEETS—SHEET 4.
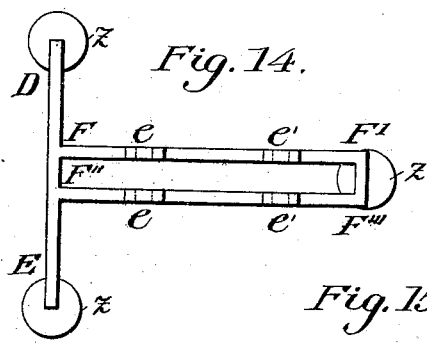
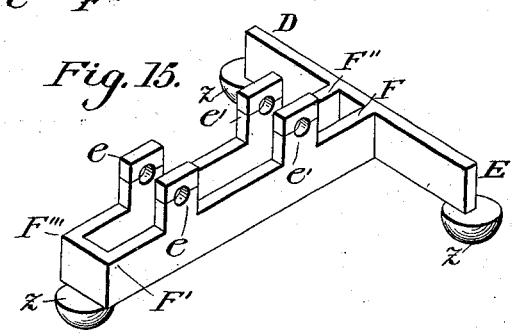
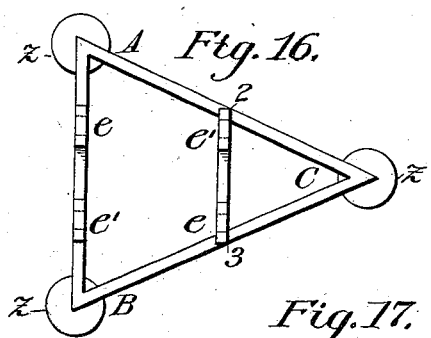
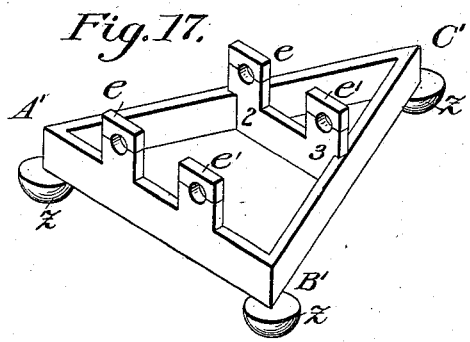
Witnesses:
Alice Ross
Grace Dalzell
Inventor:
Philippe Montsabrè

UNITED STATES PATENT OFFICE.

PHILIPPE MONTSABRÈ, OF FRESNO, CALIFORNIA.

MOBILE RAILROAD-TRACK.

SPECIFICATION forming part of Letters Patent No. 725,351, dated April 14, 1903.

Application filed March 13, 1902. Serial No. 98,109. (No model.)

*To all whom it may concern:*

Be it known that I, PHILIPPE MONTSABRÈ, a citizen of France, residing at Fresno, in the county of Fresno and State of California, have invented new and useful Improvements in the Construction of a Mobile Railroad, by which motors, cars, or wagons run upon a double endless self-laying track made up of tripods and binary mobile rails, of which the following is a specification.

The object of my invention is to construct an endless track of a series of sections called "tripods" supporting the traction-rails for the vehicles. These tripods are pivoted together so as to flex in both a vertical and horizontal plane. Every tripod supports a double rail P P P' P', bifurcated at both ends with connecting double rail O O O' O', journaled between the ends of the bifurcated rails P P, and two cross-bars R R R' R' act upon the shafts X X and X X of two successive tripods to regulate the horizontal flexion of every segment of the rail-track. The wheels running on this double rail-track have a flange in the middle of their peripheries, and the axles of the wheels are kept perpendicular on the endless rail-track by using trucks with four wheels. Briefly told, this is the main feature of my invention, as will be more fully explained by reference to the accompanying drawings, in which—

Figure 1 is a plan or top view of a tripod used as an element in the construction of an endless rail-track. Fig. 2 is a perspective view of the same; Fig. 3, an elevation or side view of the same tripod. Figs. 4 and 5 show the intimate connection and construction of a tripod-foot Z. Fig. 6 shows a plan section through a double bifurcated rail P P P' P'. Fig. 7 is a vertical section through the cross-bars R R R' R' and the horizontal shaft X X. Figs. 8 and 9 are top views of several segments of tripods with binary mobile rails when they are turning or when they are disposed to go on a straight line. Fig. 10 is a vertical section through a vehicle, both wheels resting upon two endless tracks of tripods and binary mobile rails. Figs. 11 is a vertical section through a turning rail O O O' O'. Fig. 12 is a plan through a turning rail O O O' O'. Fig. 13 is a vertical and lateral view of an eight-wheeled wagon moving upon two endless tracks of tripods with binary mobile rails. Figs. 14 and 15 are a plan or top view and a perspective of a tripod which is used as an element in the construction of mobile rails. Figs. 16 and 17 are respectively a plan and perspective of a modified form of tripod.

Figs. 1, 14, 16 are plan or top views of a tripod which I employ as an element in the construction of a segment of mobile rail. Figs. 2, 15, 17 are respectively perspective views of the same, and Fig. 3 is a vertical section through the same tripods A B C and D E F F' F'' F'''.

The tripods which I employ are made up of a frame A B C, formed by three side bars A B A C B C or with the three side bars D E F F' F'' F'''. Three small feet Z Z Z are placed under the frames A B C or D E F F' F'' F''' and in such manner that they are situated at the angles of an isosceles triangle or close by such a figure. Two pairs of journal-boxes *e e'* and *e e'* are erected upon the upper side of the bars A C and B C or on the upper side of the side bars F F' and F'' F''', Figs. 14 and 15, or on the upper side of the bars A B and 2 3 of Figs. 16 and 17, and these journal-boxes *e e'* and *e e'* are always erected several inches distance from the junction of the tripod-foot Z with the frame, (see Fig. 3,) and it is only by placing the journal-boxes *e e'* and the tripod-feet Z Z Z at a good distance each from other that the stability of a tripod upon the ground is obtainable. Journal-bearings *e'e'*, erected above the bars forming the frame of a tripod, are made up by erecting ears, which are of the same piece of metal as the frame A B C or the frame D E F F' F'' F'''. Each ear has a hole bored near its top, through which passes the horizontal shaft X X of the mobile rails.

In this invention the three feet Z Z Z, which are placed under the frame A B C or the frame D E F F' F'' F''' of every tripod, have for main object to prevent the oscillation of the segment of mobile rails under the pressure of the wheels traveling upon them, and they have also for object to allow the endless track to pass over the rough and uneven parts of a road. With these two ends in view the traveling feet Z Z Z are only moderately high, according to the nature of the ground upon which they are to travel. Their form is semispherical, the top of the sphere resting upon the ground, Figs. 3, 4, 5, 14, 15, 16, and 17. A spherical form being voluminous, every traveling foot Z of a tripod is made hollow to diminish its weight. The foot Z is constructed as follows: a framework formed of four sections U V U' V S V S' V, crossing each other at right angles, as seen by Fig. 5. Two of these sections U V and S V are but a prolongation from the tripod-frame A B C, and it is evident that by such construction every foot is strongly and indissolubly united under the tripod. The sections U' V and S' V are then united upon the sections U V and S V, and these four sections forming the framework of every traveling foot Z are in such a shape on the outside that a spherical metallic envelop can cover them, Figs. 4 and 5.

In this invention two cross-bars R R and R' R', Fig. 7, are also employed as an element in the construction of a segment of mobile rails for regulating the turning motion of an endless rail-track to the right or to the left. These cross-bars R R and R' R' have also for object to force the horizontal shaft X X to turn into the journal-bearings e e' of a tripod when the endless rail is turning around the drum-wheels G G', and it is with these ends in view that these cross-bars are made up of flat rods bifurcated at both ends, Fig. 7. Each extremity of a cross-bar can pivot on a vertical axle I I, perpendicular on the horizontal shaft X X of the mobile rails, and it is by pivoting on that vertical axle I I that these cross-bars regulate the turning motion to the right and to the left of every segment of mobile rail. Each extremity of a cross-bar R R or R' R' and the horizontal shaft X X have square surfaces at their meeting junction, and the shaft X X is firmly held between the jaws or branches of the cross-bars R R R' R' by such construction. The horizontal shaft X X is then forced to turn into the journal-bearings e e' of a tripod.

A horizontal shaft X X is also employed as an element in the construction of every segment of mobile rail. The shaft X X is constructed rectangular in cross-section, except at the journal-boxes, where it is round, and to diminish weight the shaft is made hollow. Each horizontal shaft X X is devised to turn into a pair of journal-bearings e e', erected above a tripod, and the same shaft X X turns also at its junction in the two branches of a bifurcated rail P P P' P'; but at any other place the sectional form of the horizontal shaft X X is rectangular, Fig. 7. By such construction the extremities of the turning rail O O O' O' and the extremities of the cross-bars R R R' R' are lying square upon the top of the rectangular parts of that shaft X X.

Each horizontal shaft X X is constructed with four axles and is rectangular-shaped at any other place, and so as to diminish its weight its inside is hollow.

In this invention the endless rail-track is formed by turning rails O O O' O' and bifurcated rails P P P' P', alternating one after the other, Figs. 6 and 11. The bifurcated rail P P P' P' is bifurcated and semicircular at both ends. This semicircular bifurcation of the rail P P P' P' has for object to hold between its branches the extremities of a turning rail O O O' O', Figs. 11 and 12, which is supported by the same horizontal shaft X X, Figs. 8 and 9. The turning rail O O O' O' has rounded extremities and pivots on vertical axles I I, secured upon the middle of the shaft X X and on the shaft X X of the next successive tripod. Each turning rail O O O' O' has on its side a longitudinal opening, Fig. 11, allowing the cross-bars to cross under them. Every link of a turning rail O O O' O' and every link of a bifurcated rail P P P' P' are made up by two straight steel bars parallel to each other and indissolubly united at their ends only, as shown by Figs. 6, 11, and 12, so that both rails O O and O' O' and the rail P P and P' P' can be considered as made of the same piece of metal. This method of constructing every link of rail gives me some right to call them in a general way "binary rails," (binary definition: a thing made of two parts,) and by such a name it will be easy to distinguish them from the already-numerous patterns of mobile rails presented by previous inventors.

Some inventors have formed every link of their rails with two parallel steel bars which are used by them as flanges, containing inside of them a rail-plate; but in my invention these two parallel steel bars are used as rails, the wheels running on top of their surfaces. Some other inventor shows also two distinct tracks of rails, wheels running upon each of these rail-tracks; but in my invention the system is made of one double-rail track; so what I consider as my improvement in every link of mobile rail which I make use of is the indissoluble union of two parallel rail-bars at their extremities only, the small separation existing between the two rail-bars, a link of rail being bifurcated at both extremities when a turning rail has rounded extremities and can pivot on a vertical axle I I.

As a consequence of the above-described construction of every link of mobile rail it follows that all wheels running on them have a flange Y around the middle of their circumference, as seen by Figs. 10 and 13. The axle of the wagons running upon an endless track of tripods and binary mobile rails are kept always perpendicular on this rail-track by placing the wagons upon trucks having four wheels. These trucks are built like those of railways, except that every wheel is provided with hubs, so that it can turn around its axle, Figs. 10 to 13. The wheels have hubs for the purpose not only to turn more easily along curves, but also for the purpose to slide slightly along their axles when turning. The wheels of the cars of the railroads slide laterally and longitudinally when turning; but in this system of mobile rails with wheels having hubs only lateral sliding occurs, which is caused by the mobile rails describing only segmental curves such displacement is very slight. It may be one-fourth of an inch and can be very easily made, as the lateral force necessary to effectuate such displacement is acting on the spokes of the wheel, as a lever, to effectuate such displacement along the axle.

Having thus far described minutely the construction of all the elements employed by me in forming an endless track of tripods with binary mobile rails, I will now proceed to explain how the above elements are assembled to form the endless-rail track.

Fig. 9 and Fig. 8 are a plan or top view of several segments of an endless track of tripods with binary mobile rails. The letters A B C show the tripods fully described already. A succession of tripods A B C or D E F F′ F″ F‴ are placed at some distance behind one another, each having the same general direction. Horizontal shafts X X pass through each pair of journal-bearings e e′, erected upon every tripod A B C. As before stated, two kinds of rails are employed in this invention. A bifurcated rail P P P′ P′, bifurcated and semicircular at both ends, is supported at its extremities by the two shafts X X and X X, which are journaled in the bearings e e′, erected upon the same tripod. This bifurcated rail is immovable, and the mobile shafts X X, which support them, turn in their extremities, and every tripod A B C supports a bifurcated rail P P P′ P′. The extremities of a turning rail O O O′ O′ is then intercalated between the branches of two successive bifurcated rails P P P′ P′ and P P P′ P′. From this disposition it follows that the shafts X X and X X of two consecutive tripods A B C and A B C support the extremities of every turning-rail O O O′ O′, which can also pivot on a vertical axle I. Two cross-bars R R and R′ R′ are fixed by their extremities upon the same two shafts X X and X X, upon which are the extremities of a turning-rail O O O′ O′. Each extremity of a cross-bar pivots on a vertical axle I, which is always exactly at the same distance from the vertical axle I of the turning rail O O O′ O′.

One of the greatest difficulties to overcome in the construction of an endless track of mobile rails has always been to turn to the right and to the left along a series of concentric curves, and Fig. 8 is drawn especially to show how such difficulty is overcome in this invention. A deviation of four or five degrees only of a turning rail O O O′ O′ under the control of the cross-bars is sufficient to place the successive segments of mobile rails almost along a regular curve, and several segments, each deviating five degrees only, are nevertheless sufficient for a wagon to turn upon these mobile rails into a circle of sixteen meters of diameter, which shows their ability to turn into the different streets of a town and to go over all cross-roads which may be met in the way. The segments forming this endless track of mobile rails turn up and down when the horizontal shaft X X turns into its journal-bearings e e′ of a tripod, and every segment can turn right or left when the turning-rails O O O′ O′ are pivoting on their vertical axle I under regulation of the cross-bars R R R′ R′.

Fig. 13 is an elevation and side view of an endless track of tripods with binary mobile rails adapted upon an eight-wheel wagon. The endless track turns around two polygonal drum-wheels G G′, placed at the head and rear of the wagon, and an octagonal drum-wheel is certainly in my judgment the best drum-wheel which can be employed for that purpose. Every wheel of this wagon has a flange Y, which is in the middle of its periphery, which flange Y is all inserted between the double rail O O O′ O′ and P P P′ P′, forming the rail-track. By such disposition the wheels can never leave this mobile rail-track, and the safety of the wagons running upon them is made secure, Figs. 10 and 13.

Having thus described the nature of my invention and the manner in which I carry the same into effect, I would have it understood that I do not claim the employment, generally considered, of an endless rail-track carried by motors or vehicles, which track lies always on the ground for the wheels to run thereon; but

What I claim as my invention, and desire to secure by Letters Patent, is—

1. An endless track for traction engines or cars consisting of a series of tripods, horizontal shafts X X journaled thereon and supporting a series of jointed double rails adapted to flex horizontally by means of connecting cross-bars R R R′ R′ substantially as set forth.

2. A section of an endless track for traction engines or cars consisting of tripods made up of side bars forming its frame, and supported by three feet Z Z Z placed at the corners of an isosceles triangle—two pairs of journal-boxes e e′ on the upper side of the tripod-frame, which are always placed backward from the tripod-feet and shafts X X journaled therein substantially as described.

3. An endless track for traction engines and cars consisting of sections made up of tripods with a triangular frame, which are journaled together, and provided with feet Z on the angles thereof, said feet being of circular form, and their inside divided in four parts, by four partitions, two of which are prolongations of the tripod-frame, the tread-surface of the feet Z being covered by a spherical metallic envelop, substantially as described.

4. An endless track for traction engines and cars consisting of a series of tripods, horizontal shafts X X thereon and supporting a double rail P P P′ P′ with bifurcated ends, connecting and turning double rails O O O′ O′ journaled between the ends of the bifurcated rails, substantially as set forth.

5. An endless track for traction engines and cars which consists of sections called tripods pivoted together so as to flex in a horizontal plane, by pivoting on a vertical axle fixed at each end of a turning rail O O O' O' which movement is regulated by two cross-bars R R R' R' with extremities pivoting also on a vertical axle I I substantially as set forth.

6. An endless track for traction engines and cars, which consists of sections called tripods, horizontal shafts X X and X X of two successive tripods journaled thereon and supporting two cross-bars R R R' R' made up by bars bifurcated at both ends, clasping between their branches the horizontal shafts X X and X X to which they are secured by vertical axles I I passing through their extremities, substantially as set forth.

7. The combination with mobile rails P, P', O, O', cross-bars R, R' and shafts X, of the tripods or triangular frames, substantially as described.

8. The combination with the tripods, shafts X, mobile rails P, P', O, O', and cross-bars R, R', of engines, motors, or cars having wheels provided with hubs and with flanges Y located in the middle of their peripheries.

In testimony whereof I have signed my name to this specification in the presence of two subscribing witnesses.

PHILIPPE MONTSABRÈ.

Witnesses:
GRACE DALZELL,
EDNA NUTTING.